United States Patent [19]
Hansen

[11] Patent Number: 5,442,456
[45] Date of Patent: Aug. 15, 1995

[54] METHOD AND APPARATUS FOR MULTI-LEVEL NAVIGABLE VIDEO ENVIRONMENT

[75] Inventor: Benjamin E. Hansen, Westminster, Colo.

[73] Assignee: U S WEST Advanced Technologies, Inc., Boulder, Colo.

[21] Appl. No.: 272,909

[22] Filed: Jul. 8, 1994

Related U.S. Application Data

[63] Continuation of Ser. No. 40,802, Mar. 31, 1993, abandoned.

[51] Int. Cl.⁶ .............................................. H04N 5/76
[52] U.S. Cl. ..................................... 358/342; 358/343
[58] Field of Search ............... 358/335, 342, 341, 343, 358/310; 360/33.1, 35.1, 72.1, 72.2, 19.1; 369/32, 47, 48; H04N 5/76, 5/765, 5/775, 5/78, 5/781, 5/782, 5/92, 7/97, 5/91

[56] References Cited

U.S. PATENT DOCUMENTS

| | | | |
|---|---|---|---|
| 4,688,105 | 8/1987 | Bloch et al. | 358/335 |
| 4,849,827 | 7/1989 | Hashimoto et al. | 358/342 |
| 4,860,123 | 8/1989 | McCalley et al. | 358/342 |
| 4,897,511 | 1/1990 | Itaya et al. | 128/18 |
| 4,905,094 | 2/1990 | Pocock et al. | 358/342 |
| 5,032,926 | 7/1991 | Imai et al. | 358/335 |
| 5,065,252 | 11/1991 | Yoshio et al. | 358/335 |
| 5,122,886 | 6/1992 | Tanaka | 358/342 |

OTHER PUBLICATIONS

Hoffert et al., Quick Time: An Extensible Standard for Digital Multimedia, 1992, pp. 15-20.

*Primary Examiner*—Tommy P. Chin
*Assistant Examiner*—Thai Tran
*Attorney, Agent, or Firm*—Brooks & Kushman

[57] ABSTRACT

An apparatus for generation of multi-level navigable video environments is disclosed. Generation of the virtual realities is accomplished by a video monitor, a touch screen, a CPU, and a compact disc storage device. The storage device contains pre-generated audio and visual data. The visual data includes a plurality of digitized photographic images stored as a plurality of frames of a visual track. The frames may be selectively accessed by a user through the touch screen to provide the user the ability to navigate through a navigable video environment. Further, while the user is within the navigable video environment, a second-level of a navigable video environment is accessible. The data for generation of the second-level of video environment is also stored within the storage device and is also pre-generated.

8 Claims, 6 Drawing Sheets

METHOD AND APPARATUS FOR MULTI-LEVEL NAVIGABLE VIDEO ENVIRONMENT

This is a continuation of application Ser. No. 08/040,802 filed on Mar. 31, 1993, now abandoned.

FIELD OF THE INVENTION

The present invention relates to computer generated interactive navigable video environments, and more particularly, user controlled navigable video environments having at least a second-level navigable video environment.

BACKGROUND OF THE INVENTION

In the development of computer based tools, one significant concern is the interface between the computer and the human user, i.e. the "man-machine" interface. Early computer man-machine interfaces were entirely character based, which required a user to type in the individual commands that made the computer perform such tasks as opening a document, storing a document, deleting a document, etc. Character based interfaces require a user to have a high degree of computer literacy in order to use each command properly and as such are non-intuitive and unforgiving in that each command must be typed according to the proper syntax, without a mistake, before the command will be executed by the computer. The MS-DOS ® operating system by Microsoft is an example of such a character based man-machine interface.

A significant advance over the character based interface was the icon based interface, which provided a symbol on the screen of the computer to represent a particular action or application. In a typical icon based interface, a number of icons are displayed on a computer screen. A user performs a task, such as executing a program, by selecting the icon with an input or pointing device, for example, with a computer mouse. After selecting the icon with the mouse, a window typically appears on the screen. The user then uses the program by typing in the window. If the user wishes to execute another program, another icon is selected, which in turn opens another window on the screen. The use of a computer mouse greatly facilitated the icon based interface, as well as reducing the use of a keyboard. The Windows ® operating system by Microsoft is an example of such an icon based man-machine interface.

The most recent advance in man-machine interface is the use of touch screens. A touch screen allows a user to directly control a program through direct contact, either by finger or stylus, with the computer screen. The direct interaction provided by a touch screen eliminates the need for a mouse. Thus, the use of touch screens provides the user with an extremely desirable man-machine interface. A detailed description of touch screen technology is provided in U.S. Pat. No. 4,897,511 to Itaya et al.

Another advance in computer technology is the provision of multi-media presentations. Multi-media is a term that generally describes audio-visual related computer applications and may include digitally stored video images (such as frames from film footage or, alternatively, still photographs). Multi-media, when combined with touch screen technology, can be used to provide a navigable video environment to a user. As is known by those skilled in the art, a navigable video environment attempts to emulate visually to a user a predetermined environment such that the user can navigate that environment. In simpler terms, an effective navigable environment is "just like being there."

Prior art attempts at creating a realistic navigable video environment have been met with mixed success. Perhaps the most successful of such navigable video environments has been the "Virtual Museum" project jointly developed by Apple Computer, Inc., the Massachusetts Institute of Technology, and the University of Regina in Canada. The Virtual Museum is a computer based rendering of a museum which contains objects of interest that can be individually examined. The user can interactively move through the museum, via input from a touch screen, and selectively pull up and view certain objects from a variety of perspectives. A complete description of the Virtual Museum project can be found in *The Virtual Museum: Interactive 3D Navigation of a Multimedia Database*, Miller et al.

One deficiency of the Virtual Museum, however, is that the user is only able to view one level of video environment. For example, the user cannot move through the Virtual Museum and also control a second level video environment being played on a television object within the Virtual Museum.

SUMMARY OF THE INVENTION

The present invention utilizes touch screens in conjunction with multi-media technology to create a navigable video environment that can be interactively controlled by the user. Moreover, the present invention provides multiple levels of video environment, enabling the user to manipulate a navigable video environment within another navigable video environment.

The present invention includes a video monitor for displaying video images, user input means, data storage means, and a CPU. The data storage means contains pre-generated data that is stored in a data structure. The data structure includes a plurality of tracks, including a parent movie track for generation of a parent video environment. The parent movie contains an ordered sequence of photographs taken from at least one parent movie photograph location and which are stored as a sequence of parent movie frames in the parent movie track. Pre-determined parent movie frames include at least one child movie region. The child movie region defines areas wherein a child video environment may be accessed.

Another of the tracks is a child movie track for generation of a child video environment. The child movie contains an ordered sequence of photographs taken from at least one child movie photograph location and which are stored as a sequence of child movie frames in the child movie track.

The CPU is coupled to the video monitor, user input means, and data storage means. The CPU is programmed to display on the video monitor a parent movie frame from said parent movie track, monitor the user input means for input from a user that is indicative of a desire to navigate through parent video environment and, if input is received, displaying another parent movie frame in accordance with the specific input. The CPU also monitors the user input means for input from the user indicative of a desire to navigate through the child movie video environment. If input is received, the present invention determines the size and location of the child movie region of said parent movie frame currently being displayed on the monitor and displays a child movie frame from the child movie track on the monitor in accordance with the specific child movie input.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
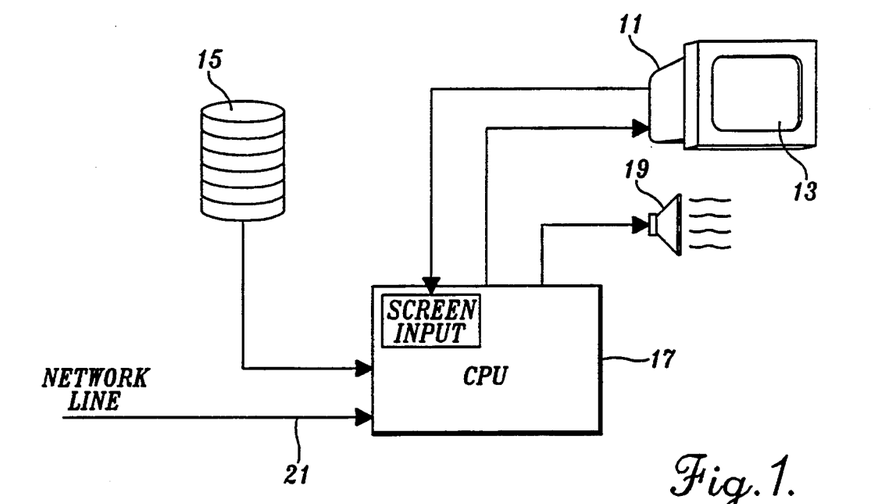
FIG. 1 is a pictorial representation of the apparatus of the present invention.

As seen in FIG. 1, the preferred embodiment of the present invention includes a video monitor 11 having a touch screen 13, a compact disc 15, a CPU 17, and an audio speaker 19. As will be seen below, these elements operate together to generate a multi-level navigable video environment that can be interactively controlled by a user.

The CPU 17 has three separate inputs: one from the compact disc 15 or a related type database such as a magnetic disk or other storage media, one from the touch screen 13 via the monitor 11, and one from a network line 21. The CPU 17 also has two separate outputs: one to monitor 11, and one to speaker 19. The inputs to CPU 17 from the touch screen 13 and, through access to either compact disc 15 or network line 21, allow the user to interactively control the navigable video environment.

The touch screen 13 provides a convenient man-machine interface which allows direct manipulation of the present invention. The touch screen 13 may be of the type described in U.S. Pat. No. 4,897,511 to Itaya et al. It can be appreciated that, although in the preferred embodiment of the present invention, touch screen 13 is the human-machine interface, the present invention can be equally effective with other interface devices, such as a computer mouse. Nevertheless, the use of the touch screen 13 is preferred, as it further adds to the realism of the navigable video environment provided by the present invention.

The compact disc 15 stores data that is used in generating the navigable video environment. As detailed below, all of the data for creation of the navigable video environment are generated prior to interactive operation by the user. It is contemplated that a plurality of compact discs or network databases could be used to store the data for one navigable video environment. Although in the preferred embodiment, data are stored in compact disc 15, it can be appreciated that other memory devices, such as magnetic disks, are equally suitable. Furthermore, the data for generating the video environment may be stored off-site and which can be accessed in real time via a network line 21. Network line 21 thus provides access to auxiliary sources of data, such as a remote memory device (not shown) or a computer network.

The provision of a navigable video environment is useful in several contexts. As noted above, a single level navigable video environment has already been provided to emulate a museum. Another important application of the present invention is the electronic provision of goods and services. Indeed, the detailed description of the preferred embodiment can be understood more clearly when the present invention is described in the context of a comprehensive example of one possible application of the present invention. Specifically, the present invention will be described in the context of a "travel agency video environment" wherein the user can shop for a vacation trip. In actual operation, the user will activate the apparatus of FIG. 1.

Once the selection of the travel agency video environment is made, the CPU 17 accesses the data associated with the travel agency video environment from the compact disc 15. The data are stored on compact disc 1. 5 in a predetermined data structure. The particular data structure used by the present invention is closely related to the data structure used by the QuickTime system by Apple Computer, Inc. For a more complete description of the QuickTime data structure, the reader is directed to Hoffert et al., "QuickTime: An Extensible Standard for Digital Multimedia," *Proceedings of the IEEE Computer Conference (CompCon '92)*, February 1992, "Inside Macintosh: Quicktime" Developer Technical Publications, 1992, and "Inside Macintosh: Quicktime Components," Developer Technical Publications, 1992. Although related to the data structure paradigm shown in QuickTime, the present invention further develops the data structure to provide a multi-level navigable video environment.

Figure 3:
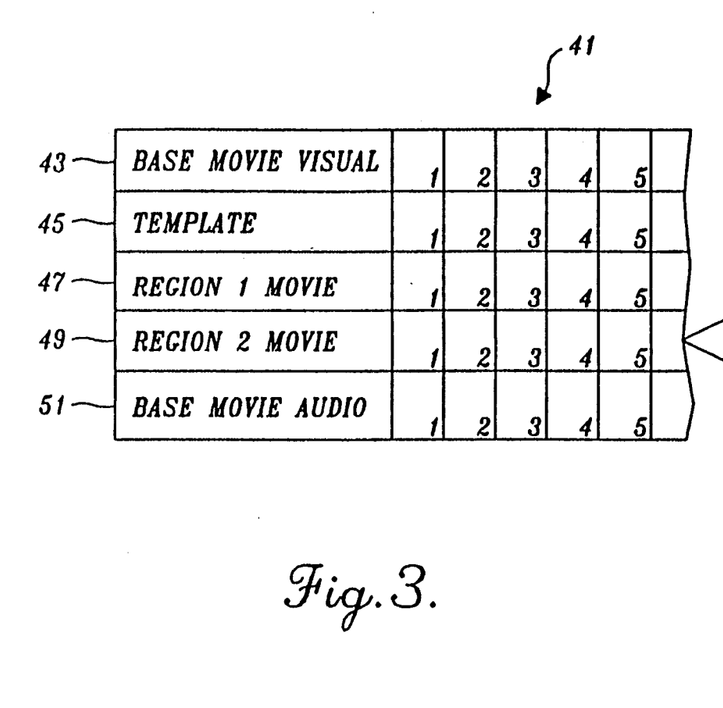
FIG. 3 is a representation of the data structure containing the data used in the present invention.
Figure 3A:
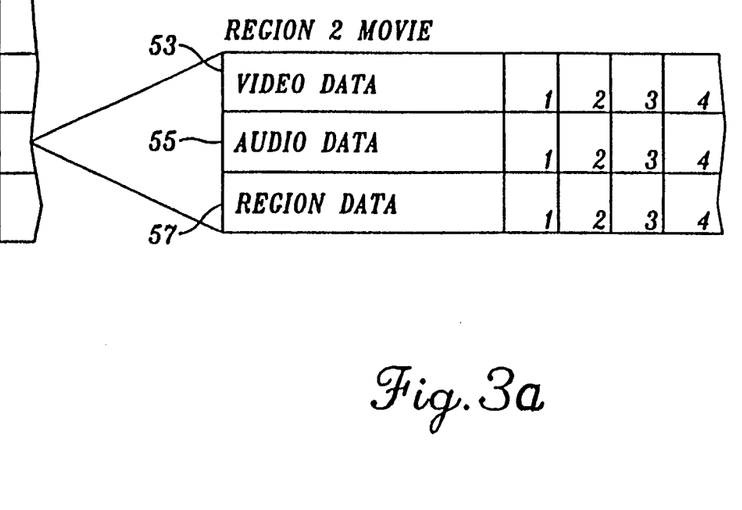

Turning to FIG. 3, the data structure 41 of the present invention is comprised of a series of data tracks. Analogous to the various tracks of a motion picture film, each data track in the data structure 41 contains information for one particular aspect of the complete travel agency video environment. As seen, the data structure includes a parent movie visual track 43, a template track 45, a region 1 movie track 47, a region 2 movie track 49, and an audio track 51.

Describing each track in detail, the parent movie visual track 43 contains the visual portion of the travel agency navigable video environment presented to the user on the monitor 11. The parent movie visual track 43 is comprised of a plurality of frames (designated by numerals 1–5). Each of the frames contains the data that allow CPU 17 to generate a visual image on monitor 11. Although it is the data within the frames of the parent movie visual track 43 that are actually used to generate an image on monitor 11, for brevity, the term frame as used herein refers also to the image that may be generated from the data contained within the frame. Alternatively, each frame of the parent movie visual track 43 may contain "pointer" information which indicates to the CPU 17 a memory location elsewhere that contains the data for generation of the video image.

Figure 2:
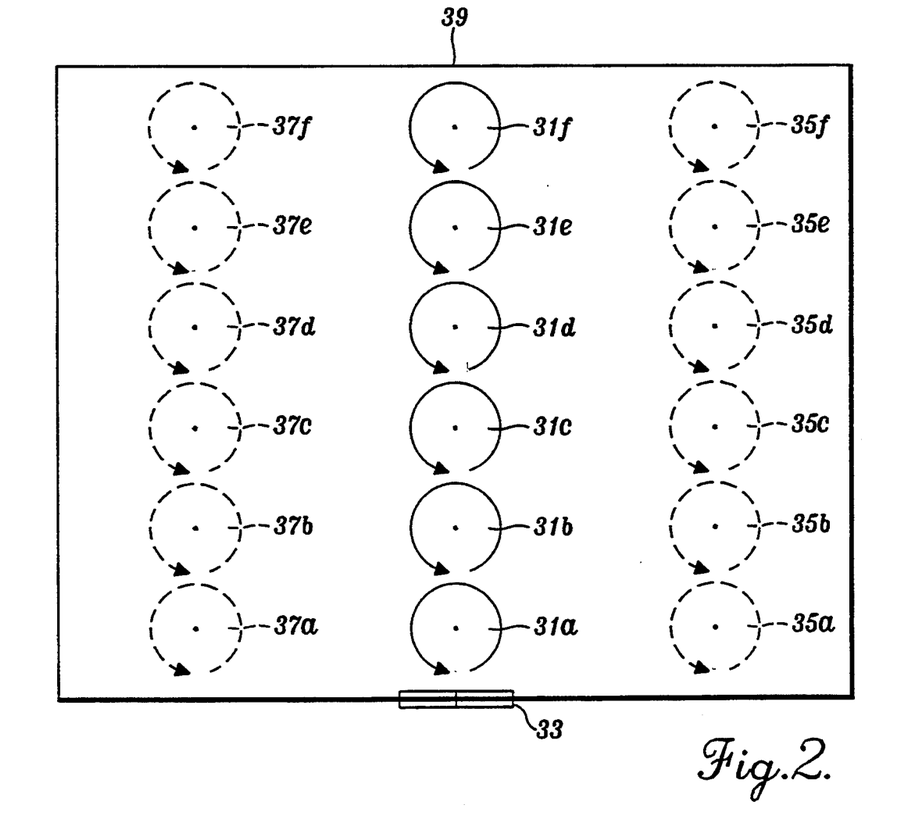
FIG. 2 is a pictorial representation that illustrates the generation of video data for the parent movie visual track.

The data in the frames of the parent movie visual track 43 are generated by digitizing a plurality of video images, such as that obtained from a video camera. The video images are obtained by videotaping the interior of an actual travel agency office at a plurality of locations and perspectives. For example, referring to FIG. 2, a plurality of videotaping locations 31a–31f within the interior of an travel agency are shown. In the preferred embodiment, the videotaping locations 31a–31f are at approximately three feet increments from each other. The three feet increments can be varied to suit the particular application. However, in the case of a travel agency video environment, the three feet increments are preferred, since they roughly correspond to a single stride of an average adult. FIG. 2 illustrates six videotaping locations 31a–31f located along a line from the entrance 33 of the travel agency to the back wall 39 of the travel agency. It can be appreciated that for a more detailed and complete travel agency video environment, additional videotaping locations 35a–f and 37a–f may be included in the parent movie visual track 43.

At each videotaping location 31a–f, a plurality of video images are taken as the video camera is panned in a full circle. By determining the number of video frames per second recorded by the video camera and panning the video camera at a predetermined speed, a desired angular resolution can be obtained. Specifically, if for example, the video camera is rotated at 360 degrees per second and the video camera operates at sixty frames per second, then one video frame is recorded every six angular degrees.

In the preferred embodiment, at each videotaping location 31a–31f, a video camera is mounted on a tripod and rotated full circle as shown in FIG. 2. Thus, initially, the video camera is facing away flora entrance 33 and towards back wall 39 (on FIG. 2, facing "twelve o'clock"). The video camera is then rotated in a counter-clockwise direction until the video camera returns to its starting orientation. The result is a sequence of video images that are recorded on video tape, which, if the camera was rotated at 360 degrees per second and the camera records sixty frames per second, are six degrees offset from each other. Thus, the sequence of video images at each particular videotaping location 31a–31f comprises 60 video images spanning 360 degrees. Moreover, because of the systematic manner in which video images are taken (at six degree counterclockwise increments), at each videotaping location 31a–31f, the sequence of photographs is referred to as an ordered sequence of photographs.

In the example shown in FIG. 2, there are sixty video images generated at each of the videotaping locations 31a–31f, for a total of 360 total video images. It can be appreciated that the number of video images obtained at each videotaping location 31a–31f is variable, depending upon the rate at which the video camera is rotated. However, in the preferred embodiment, one video image is provided for every six degrees of rotation.

The sequence of video images are stored sequentially on the parent movie visual track 43. Specifically, the first video image at videotaping location 31a (facing directly away from entrance 33) is stored in frame 1 of the parent movie visual track 43. The second video image (six degrees counterclockwise from the first photograph) is contained in frame 2. Thus, in this manner, frames 1–60 of parent movie visual track 43 are filled with the sequence of video images taken at photograph location 31a. In the same manner, frames 61–120 contains the sequence of video images taken at videotaping location 31b, frames 121–180 contains the sequence of video images taken at videotaping location 31c, frames 181–240 contains the sequence of video images taken at videotaping location 31d, frames 241–300 contains the sequence of video images taken at videotaping location 31e, and frames 301–360 contains the sequence of video images taken at videotaping location 31f.

As noted above, to provide a more detailed travel agency video environment, additional videotaping location 35a–f and 37a–f may be included in the parent movie visual track 43. For example, frames 361–420 might contain the sequence of video images taken at videotaping location 35a, frames 421–480 might contain the sequence of video images taken at videotaping location 35b, frames 481–540 might contain the sequence of video images taken at videotaping location 35c, frames 541–600 might contain the sequence of video images taken at videotaping location 35d, frames 601–660 might contain the sequence of video images taken at videotaping location 35e, and frames 661–720 might contain the sequence of video images taken at videotaping location 35f. The video images from videotaping location 37a–37f can similarly be stored in successive frames of the parent movie visual track 43.

As a further illustration of the contents of the parent movie visual track 43, FIG. 4 is a pictorial representation of the initial frame of the parent movie visual track 43 for the travel agency video environment. The video image would be displayed on monitor 11. Thus, what is pictorially shown is an image of the video image taken from videotaping location 31a looking towards the interior of the travel agency.

Figure 4A:
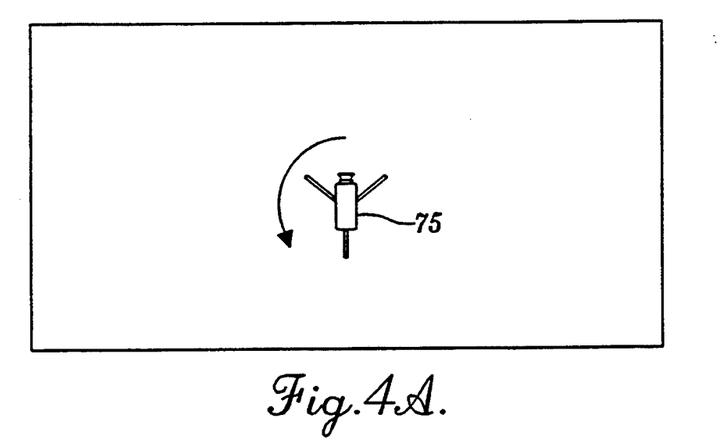
FIGS. 4A–4C illustrate the various methods of generating an ordered sequence of video images for use with the present invention.
Figure 4B:
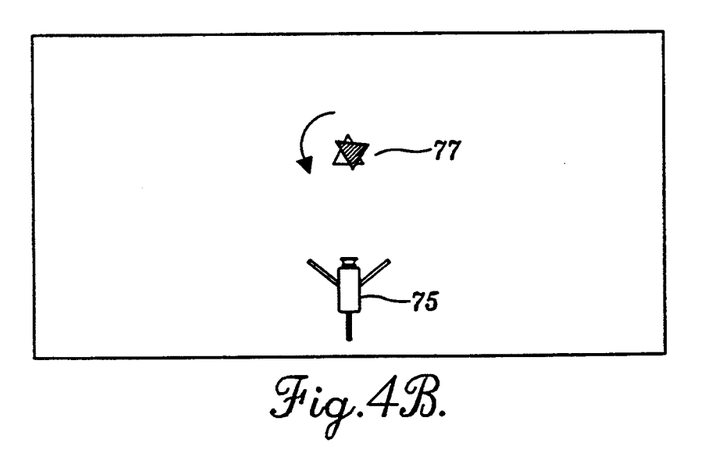
Figure 4C:
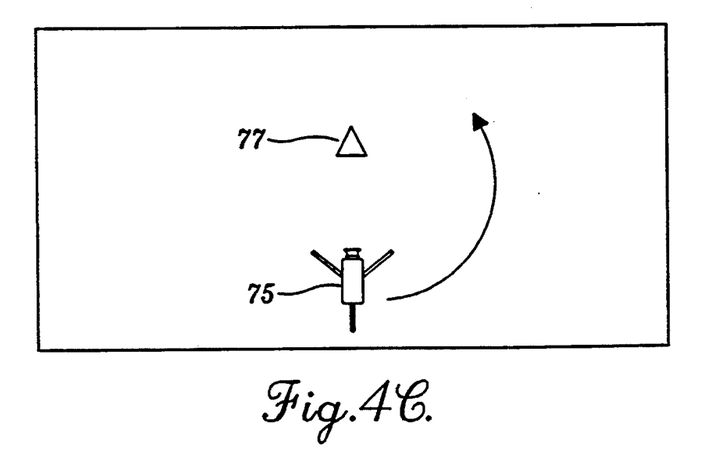

The method described above of generating an ordered sequence of video images is referred to as the "center of the universe" approach to providing a video environment. Referring to FIG. 4A, the center of the universe method is so named because the video camera 75 is stationary at a location, but rotates around that location for a sequence of video images. Referring to FIG. 4B, an alternative method of generating a sequence of video images for use in navigable video environments is the "dolly" method. The dolly method moves the video camera in a circular fashion around an object of interest 77, thus capturing video images of the object of interest 77 in a wide variety of angles. Finally, referring to FIG. 4C, another alternative method of generating a sequence of video images is the "lazy susan" method whereby the video camera 75 is fixed at a location and does not rotate. Instead, the object of interest 77 is rotated about its own axis and the video images capture various angles of the object of interest 77.

In general, it has been found that the center of the universe method is most applicable and useful for generating the video images for the parent movie track. In generating the child movie tracks however, the lazy susan approach may be more useful, particularly in some applications, such as retail store video environments. In any event, it can be appreciated that the video frames of the parent movie track and the child movie tracks can be generated using any of the three methods described above.

As noted above, the provision of multi-media in a computer based environment is known in the art. However, one significant novel aspect of the present invention is the addition of child movie regions 61, designated in FIG. 5 as Region One and Region Two. It is within the child movie regions 61 that a second level of video environment (referred to herein as a "child movie") is provided to the user. In particular, each of the child movie regions 61 is a region within the video image of the parent movie visual track 43 wherein a separate video image may be manipulated by the user, independently from the parent movie.

In order to provide the child movie regions 61, each frame of the parent movie visual track 43 must be modified in those areas where a child movie region 61 exists. In particular, those areas in the frames that fall within the child movie regions 61 are "blacked out," or covered over and other identifying information is included in their place. For example, in the travel agency video environment, referring to FIG. 5, child movie Region One may have the word "PARIS" superimposed thereon. Similarly, child movie Region Two may have the word "HAWAII" superimposed thereon. Regardless of the actual video image that was taken at videotaping location 31a, the child movie regions 61 are replaced with other information. The words "HAWAII" and "PARIS" provide an indication to the user that, if desired, the user can navigate a second-level video environment and perhaps obtain further information on the designated destinations. Thus, each of the child movie regions 61 represents an avenue to further information regarding a destination resort. Importantly, the provision of the child movie regions by the present invention, unlike the video environment provided by the Virtual Museum noted above, takes place while the user can navigate the parent movie. In other applications of the present invention, for example where the parent movie is a retail store, the child movies may be the products sitting atop the shelves of the store or perhaps the objects of interest in a museum.

The process of blacking out the child movie regions 61 must be done for each frame in the parent movie visual track 61. It can be appreciated by those skilled in the art that each frame will have a different area of the frame blacked out, since each frame provides a differing perspective view of the travel agency and thus a different perspective on the child movie regions 61. Indeed, many frames may not have any regions that are blacked out. For example, those frames that contain images that face away from back wall 39 will not have any areas that are blacked out, since child movie regions 61 do not appear in the frames.

Returning to FIG. 3, in order to provide the second level navigable video environment, the template track 45 of data structure 41 is crucial. The template track 45 is derived from and is based upon the parent movie visual track 43. In particular, each frame of the parent movie visual track 43 is analyzed and the outer boundaries of each of the desired child movie regions 61 in that particular frame are determined. It can be appreciated that for other frames in the parent movie visual track 43, the boundaries of the child movie regions 61 will vary. Specifically, the first frame of the parent movie visual track 43 provides a "heads on" view of the child movie regions 61. In contrast, frame 5 of the parent movie visual track 43 will be a view thirty degrees counterclockwise from the first frame, and thus, the location and dimensions of child movie regions 61 shown on the video monitor 11 may be significantly different than those of the first frame. As noted above, for many of the frames, the associated template track 45 will be blank, since in those frames, the child movie regions 61 are not within view.

The location and dimensions of each of the child movie regions 61 for each frame of parent movie visual track 43 are used to define the template child movie regions 63 in the frames of the template track 45. The template child movie regions 63 are then used to determine the area (including vertical and horizontal dimensions) of monitor 11 that will be used to display the child movies. Moreover, as will be seen below, the child movie regions 61 are also used by the user to navigate through the child movies. Thus, for each frame of the parent movie video track 43, a frame of the template track 45 is produced to correspond to that frame. As seen in FIG. 3, the template track 45 includes a plurality of frames. Each of the frames of the template track 45 is uniquely associated with a frame in the parent movie visual track 43. In the preferred embodiment, frame I of the template track 45 is associated with frame 1 of the parent movie visual track 43. Similarly, frame 2 of the template track 45 is associated with frame 2 of the parent movie visual track 43. The association continues in similar fashion for all of the frames of the parent movie visual track 43.

Figure 5:
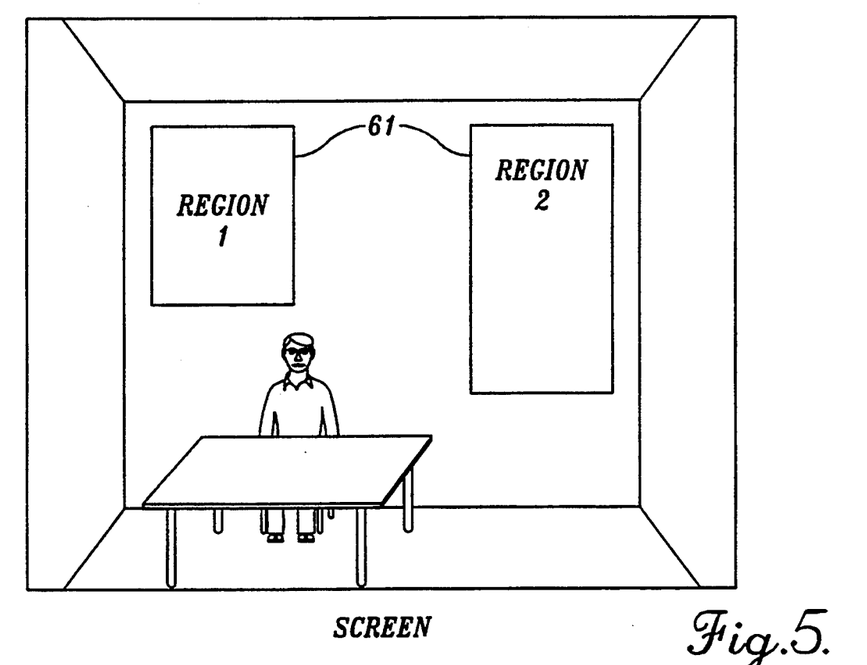
FIG. 5 is a pictorial representation of the initial frame from the parent movie visual track displayed on the computer monitor.
Figure 6:
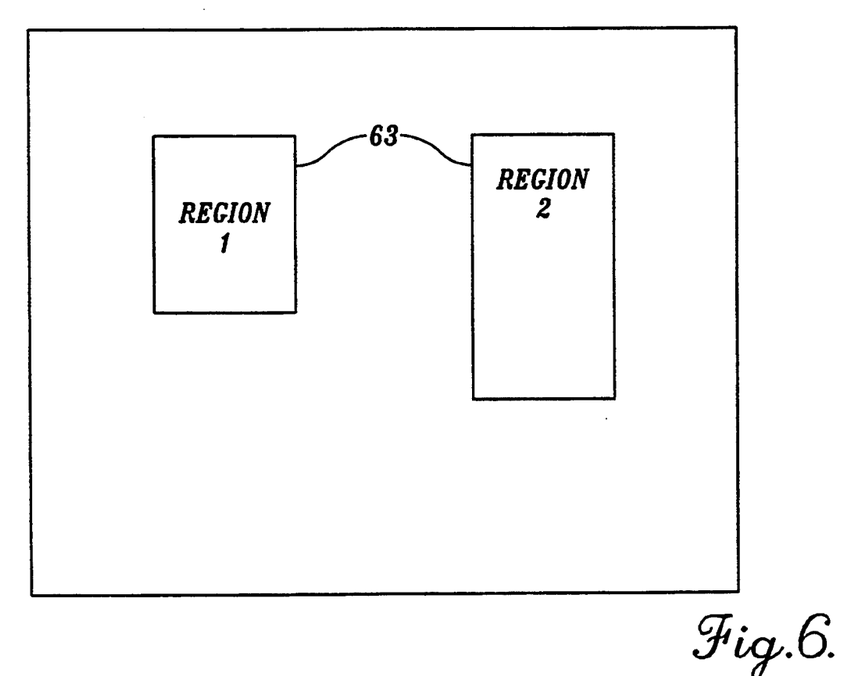
FIG. 6 is a pictorial representation of the template frame associated with the frame of the parent movie visual track shown in FIG. 4.

Referring to both FIGS. 5 and 6, the relationship between the template track 45 and the parent movie video track 43 is further illustrated. FIG. 5 is a pictorial representation of frame 1 from the parent movie visual track 43 displayed on monitor 1 I. FIG. 6 is a pictorial representation of frame 1 from the template track 45. As noted above, frame 1 of the template track 45 is associated with frame 1 of the parent movie visual track 43. Thus, the template track 45 as seen in FIG. 6 discloses the exact area of the screen in which to display the child-movies.

Returning to FIG. 3, the next two tracks of data structure 41 are the Region One movie track 47 and Region Two movie track 49. The Region One movie track 47 contains the audio-visual data for generation of the child movie to be displayed in child movie Region One. The Region Two movie track 49 contains the audio-visual data for generation of the child movie to be displayed in child movie Region Two. Both Region One movie track 47 and Region Two movie track 49 have several child sub-tracks.

The child sub tracks 53–59 for Region Two movie track 49 can be seen in FIG. 3 in exploded view. Specifically, the child sub-tracks include a video data track 53, an audio data track 55, and a region data track 57. The video data track 53 is analogous to the parent movie visual track 43 in that the frames of the video data track 53 contain visual images for the Region Two movie. The video data track 53 is generated in much the same manner as that of the parent movie visual track 43. In the example above of the travel agency where Region One of the parent movie displays the word "PARIS," the video data track 53 of the child movie for Region One may have a sequence of video images taken from, for example, the top of the Eiffel Tower using the center of the universe method. Like the parent movie, the video images of the child movie of Region One may also be taken at six degree radial increments for the full 360 degree view. Typically, in the case of a travel agency parent movie, the choice of the videotaping locations for the child movie is chosen so as to entice the user into "choosing" that particular destination as a vacation locale.

Audio data track 55 is analogous to the parent movie audio track 51 (described in further detail below) in that the frames of the audio data track 55 contain audio signals for the Region Two movie 49. As further detailed below, the audio data track 55 in the Region Two video environment may contain a continuous recording of, for example, "Hawaiian music" or a "sales pitch" detailing the attractions of Hawaii. Next, region data track 57 includes information that identifies the region in the template frames the child-movie that is to be displayed. For example, region data track 57 may include the information necessary to display the child-movie on Region Two of the parent movie visual track.

The last data track of data structure 41 is the parent movie audio track 51. The parent movie audio track 51 contains audio signals that may be used to drive speaker 19 to produce the audio sound. In the preferred embodiment, there is no requirement that any of the frames of the parent movie audio track 51 be linked to any frames of the parent movie visual track 43. For example, the parent movie audio track 51 in the travel agency video environment may contain a continuous recording of music or a "sales pitch." Generation of the parent movie audio track 51 can be accomplished by conventional means. For example, the audio sequence may be digitized and stored in digital format, not unlike that of standard musical compact discs.

With the data structure 41 of the present invention fully described, the operation and control of the interactive environment will be discussed next. In operation, when the user chooses to enter the travel agency video environment, the CPU 17 accesses the data structure 41 and automatically displays the initial frame of the parent movie video track 43 on monitor 11. As noted above with regard to the travel agency video environment, the first frame of the parent movie video track 43 is a view from the entrance of the travel agency.

The control of the interactive travel agency video environment and the second level virtual realities can be accomplished by a multitude of user interfaces ranging from keyboard entry to mouse control. However, in the preferred embodiment of the present invention, the user interface is a touch screen. The touch screen is well known in the art and responds to contact on the screen of the video monitor. As used in the present invention, the touch screen 13 responds to one types of contact with the surface of the touch screen 13 referred to as the "point."

A "point" is where the user contacts the screen at a particular point for a relatively brief time. In the case of a point, the touch screen 13 provides to the CPU 17 a signal indicative of the precise location on touch screen 13 where the contact was made by the user. In particular, the exact X-Y coordinate location of the point is conveyed to the CPU 17 by the touch screen 13. In the preferred embodiment, the X-Y coordinate system has its origin at the upper left hand corner of the parent movie.

Figure 7:
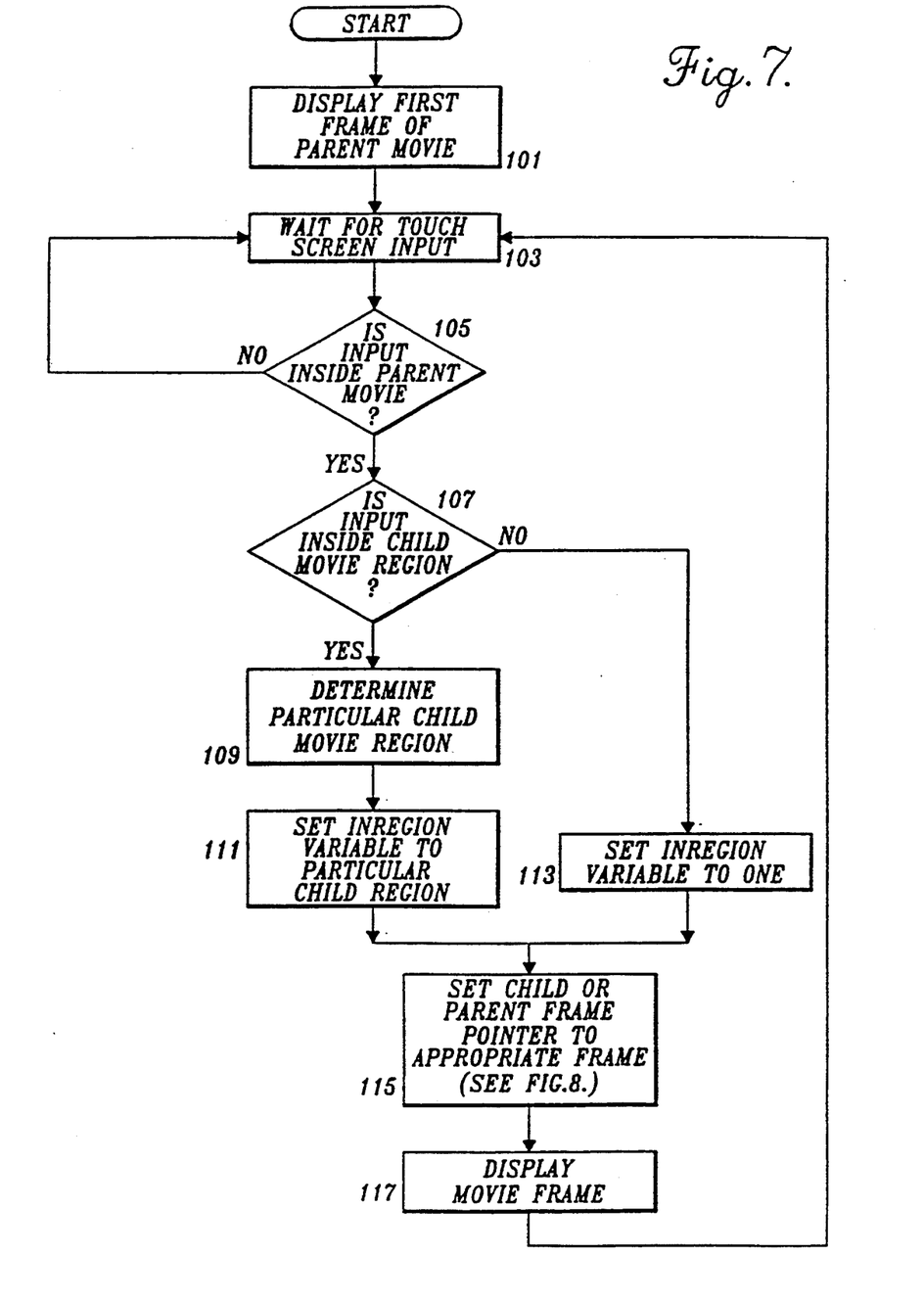
FIG. 7 is a flow diagram illustrating the operation of the present invention.

With this background on the man-machine interface used in the present invention, FIG. 7 is a flow chart of a computer program that is executed by the CPU 17 in response to the input from the touch screen 13. The flow chart illustrates the control of the parent movie visual track 43 and the child movie regions 61. With respect to the parent movie audio track 51, the audio data contained in the frames of parent movie audio track 51 are convened into audio signals by speaker 19. As noted above, in the travel agency video environment, the audio track 51 contains audio data for the production of background music or "sales pitch" information. Thus, utilization of the parent movie audio track 51 is straightforward and comprises a continuous playback of the frames of the parent movie audio track 51 in a sequential manner. When all of the frames of the parent movie audio track 51 have been played, the present invention begins replay of the frames in sequential order once again.

With regard to the visual aspect of the travel agency video environment, when a user chooses a navigable video environment, the monitor 11 at box 101 displays the initial frame of the parent movie visual track 43. Thus, in the travel agency video environment, the user will view the image taken at videotaping location 31*a* looking into the office of the travel agency. To display the initial frame, a parent frame pointer is used. The parent frame pointer is a memory register within CPU 17 that contains information determining the frame of parent movie visual track 43 to display. In the preferred embodiment, the frame pointer contains the frame number (i.e. frame numbers 1-5 of FIG. 3 ) of the frame to be displayed.

When the computer program of the CPU 17 is initiated, at a box 101, the initial frame of the parent movie is displayed. The initial frame is distinguished from the "first frame" described above in conjunction with the generation of the video tracks. Whereas first frame refers to the video image that is contained in frame number one of the video tracks, initial frame refers to the frame that is initially displayed to the user when the parent video environment is invoked. Indeed, it may well be that the initial frame is not frame one of the parent video track.

Next, at a box 103, the CPU "sits" and waits for input from the touch screen. If there is input, at a box 105, a determination is made as to whether the user input is within the bounds of the parent movie. Although in the preferred embodiment, the parent movie occupies the entire space of the monitor 11, it is also possible that for certain applications, the parent movie may only occupy a portion of the monitor screen. For example, where the present invention is operating in a multi-tasking Windows environment, the parent movie may only occupy half of the monitor screen. Thus, at box 105, preliminarily, a determination must be made as to whether the input from the user is within the parent movie.

If the input is outside of the parent movie window, control is transferred back to box 103 and the touch screen is monitored for further input. If the input is within the outer bounds of the parent movie, then at a box 107, a determination is made as to whether the input from the user is within a child movie region 61 (see FIG. 3). This determination is made with the aid of the associated frame of the template track 45 to the frame being displayed on monitor 11. In particular, the coordinates of the point are compared to the template frame. If the input is within a child movie region 61, then at a box 109, a determination is made as to which particular child movie region the input is from, if there is more than one child region. In particular, a variable designated as INREGION is set to a value that is indicative of the particular child region. Additionally, in the preferred embodiment, the variable INREGION is set to one if the input is from the parent movie (see box 113). The variable INREGION, for the first child region is set to two, for the second child region is set to three, and so on. It can be appreciated that any identifying value may be assigned to the variable INREGION to distinguish the parent region and the child regions from one another.

Next, at a box 115, the next appropriate frame of the parent movie or child movie to be displayed based upon the user input is determined. In determining the "next appropriate frame," the X-Y coordinates of the user input is necessary. As noted above, touch screen 13 provides to CPU 17 the X-Y coordinates, designated as XCORD and YCORD. Based upon the X-Y coordinates, the CPU 17 can determine if the input is generally to the left, right, top, or bottom of the center point of the parent movie region or the child regions. It is to be understood that the following description (of FIG. 8) of determining the next frame applies to both input within a child region and input within the parent region. By the use of the variable INREGION, the CPU 17 can keep track of the particular In particular, the method of box 115 is expanded and shown in FIG. 8, where at a box 119, a determination is made as to whether the value of the variable XCORD places the touch input on the left side of the region window. In that regard, by use of the template track, the boundaries of each of the child regions can be precisely determined, since the template track contains a precise map of each child region within a particular parent video frame. If the input is on the left side of the region, the present invention will cause the parent or child movie to display the next appropriate frame that provides the illusion of panning to the left. In the example of the travel agency video environment and where the input is within the parent movie region, at a box 121, the parent frame pointer is incremented by one, since the image stored in frame number 2 of base movie video track 43 is six degrees left of frame number 1. Thus, the image that will appear will be frame number 2 of the parent movie visual track 43. Recall that in the travel agency video environment, frames 1-60 of the parent movie visual track 43 comprise sixty sequential video images from videotaping location 31a at six degree increments counterclockwise and initially starting at twelve o'clock. Thus, each sequential frame contains an image six degrees offset counterclockwise relative to the previous frame. By responding to an input on the left side of the monitor 11 by displaying an image that is six degrees to the left of the previous frame, the present invention provides a realistic video environment. Indeed, should the user desire, the CPU 17 is programmed such that a continuous contact on the left side of monitor 11 will cause the entire 360 degree pan of the travel agency (while standing at videotaping location 31a) to be displayed.

Figure 8:
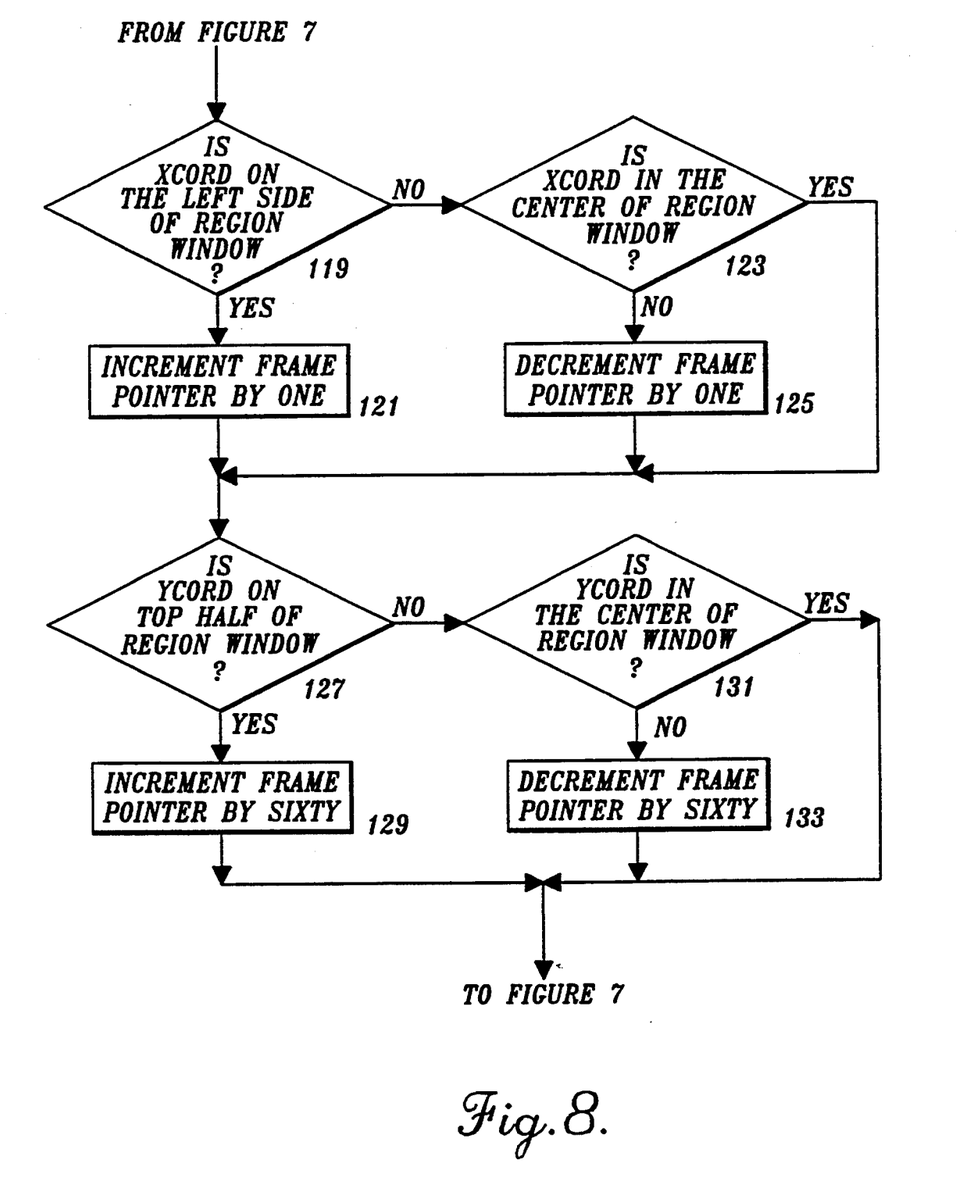
FIG. 8 is a flow diagram illustrating the method of determining the next video image to be displayed based upon user input.

Furthermore, at frame number 60 of the parent movie video track, a special situation exists whereby a right to left drag will cause the parent frame pointer to reset to frame number 1. It can be appreciated that in order to pan from right to left while at frame number 60, the frame pointer must return to frame number 1.

If the "left input" is within a child region, a similar procedure is done at box 121, i.e., a child frame pointer is set to the next appropriate frame by incrementing by one. Note that the child frame pointer is a memory register within CPU 17, which contains information that determines the frame of the child-movie video data track 53 to display. Although, the sequencing of the frames in the video data track 53 can be different from that of the parent movie visual track 43, in the preferred embodiment, the sequencing of the frames of the child-movie video data track 53 is identical to that of the parent movie video track 43. In particular, the video data track 53 contains a sequence of 60 images taken at successive six degree increments. Thus, the video data track contains a full 360 degree panorama of, for example, a beach on Hawaii, or, as another example, a full 360 degree panorama from the top of the Eiffel Tower in Paris. By responding to an input on the left side of a region by displaying a video image that provides the illusion of panning to the left, the user can control the video environment in a realistic manner.

If the input in the region is not on the left side of the region, then at a box 123, a determination is made as to whether or not the input is in the center (along the horizontal axis of the region) of the region. If not, then the input must be on the right side of the region. In such a case, at a box 125, in the case of input in the parent movie region, the present invention will cause the parent movie to display the next appropriate frame that provides the illusion of panning to the right. Similarly, in the case of a point input on the right side of the parent movie, in the example of the travel agency video environment, the parent frame pointer is decremented by one. However, in the case of the parent frame pointer being set to frame number 1, a special situation exists whereby a left to right drag will cause the parent frame pointer to reset to frame number 60. It can be appreciated that in order to pan from left to right while at frame number 1, the frame pointer must return to frame number 60. Thus, the image that will appear will be frame number 60 of the parent movie visual track 43. For all other frames currently being displayed, each time a point input on the right side of the monitor 11, the parent frame pointer will be decremented.

Similarly, if the input was on the right side of a child region, the child frame pointer is decremented by one at box 125. However, in the case of the child movie frame pointer being set to frame number one, a special situation exists whereby a right point will cause the child frame pointer to reset to frame number 60. It can be appreciated that in order to pan from left to right while at frame number 1, the child frame pointer must return to frame number 60. Thus, the image that will appear will be frame number 60 of the child movie video data track 53. For all other frames currently being displayed, each time a right point is input, the child frame pointer will be decremented.

Next, at a box 127, a determination is made as to whether the variable YCORD is on the top half of the region. If so, at a box 127, where the input is within a parent region, the present invention will cause the parent movie to display the next appropriate frame that provides the illusion of moving forward. In the case of a point on the upper half of the parent movie, at a box 129 and in the example of the travel agency video environment, the parent frame pointer is incremented by sixty. Thus, if the parent frame pointer is currently set to one and point on the upper half of the parent region is input, then the parent frame pointer is reset to sixty-one. At that juncture, the "next appropriate frame" of box 115 is frame number 61 of the parent movie visual track 43. Recall that frames number 1, 61, 121, 181, 241, and 301 contain images looking directly towards back wall 39 and at progressively lesser distances from the back wall 39. Thus, a point on the top of the parent movie results in providing the user with the perception of moving forward in the room. Similarly, if the input is on the top half of a child region, then at a box 129, the child frame pointer is incremented by sixty.

If the input is not on the upper half of the region, then at a box 131, a determination is made as to whether the input is in the center of the region. If so, then there is no action to the frame pointers and control is returned to box 117 (FIG. 7) for redisplay of the image currently pointed to by the frame pointers. If, however, the input is on the lower half of the parent or child movie, the present invention will cause the parent or child movie to display the next appropriate frame that provides the illusion of moving backward. In the case of a point in the bottom half of the parent movie, in the example of the travel agency video environment and an input to the parent region, the parent frame pointer is decremented by sixty. Thus, if the parent frame pointer is currently set to frame number 181 and a bottom to top drag is input, then the parent frame pointer is reset to frame number 121. At that juncture, the image that will appear will be frame number 121 of the parent movie visual track 43. Recall that frames number 1, 61, 121, 181, 241, and 301 contain images looking directly towards back wall 39 and at progressively lesser distances from the back wall 39. Thus, a point to the bottom half of the parent movie results in providing the user with the perception of moving backward in the room.

After the method of FIG. 8 is complete, the appropriate frame pointer has been set to the next appropriate frame number in accordance with the input from the user. Then, at a box 117, the video image is displayed on the monitor 11. Finally, control of the system is returned to box 103.

While the preferred embodiment of the invention has been illustrated and described, it will be appreciated that various changes can be made therein without departing from the spirit and scope of the invention. For example, the ordered sequence of video images may be taken at 5 degree increments in a clockwise rotation. Furthermore, the lazy susan or dolly method could also be used to generate the video images. Thus, the invention can be practiced other than that as specifically described herein.

The embodiments of the invention in which an exclusive property or privilege is claimed are defined as follows:

1. An apparatus for providing a multi-level navigable video environment to a user, said apparatus including:
   (a) a video monitor for displaying video images;
   (b) user input means;
   (c) data storage means containing pre-generated data in a data structure, said data structure including a plurality of tracks, said plurality of tracks including a parent movie track for generation of a parent video environment, said parent movie track containing an ordered sequence of video images stored as a sequence of parent movie frames on said parent movie track, certain of said parent movie frames including at least one child movie region disposed in said parent movie track, whereby said parent video environment includes at least one child movie region, said plurality of tracks further including a child movie track for generation of a child movie video environment, said child movie track containing an ordered sequence of video images stored as a sequence of child movie frames on a child movie track, said child movie track associated with and for display within said at least one child movie region of said certain of said parent movie frames of said parent movie track, the child movie video environment being navigable by the user independently from the parent video environment; and
   (d) a CPU coupled to said video monitor, said user input means, and said data storage means, said CPU programmed to:
      (i) monitor said user input means for parent movie input from said user indicative of a desire to navigate through said parent video environment and, if said parent movie input is received, displaying another parent movie frame from said parent movie track on said monitor in accordance with the specific parent movie input so as to simulate physical movement around said video image; and
      (ii) monitor said user input means for input from said user indicative of a desire to navigate through said child movie video environment disposed in said parent video environment and, if said child movie input is received, displaying a child movie frame from said child movie track on said monitor in accordance with the specific child movie input so as to simulate physical movement around said video image.

2. The computer system of claim 1 wherein said data structure further includes a template track comprised of a plurality of template frames, each of said template frames associated with a different parent movie frame of the parent movie track, and each of said template frames detailing said child-movie region of the associated frame of the parent movie track.

3. The apparatus of claim 2, further including means for automatically determining the size and location of said child movie region of said parent movie frame currently being displayed on said monitor and displaying said child movie frame within said child movie region.

4. The computer system of claim 1, further including a speaker coupled to said CPU and for providing an audio signal in conjunction with said frames displayed by said video monitor.

5. The apparatus of claim 4, wherein said user input means is a touch screen, said touch screen providing an output to said CPU indicative of the precise location of the point of contact on said touch screen.

6. The computer system of claim 5 wherein said data storage means is a compact disk.

7. A method of generating a multi-level navigable video environment on a video monitor, said multi-level navigable video environment responsive to user input from a user, said user input provided via a user input means, sand method comprising the steps of:
   (a) storing data in a data storage device in a predetermined data structure, said data structure including a plurality of tracks including a parent movie track for generation of a parent video environment, said parent movie track containing an ordered sequence of video images stored as a sequence of parent movie frames on said parent movie track, certain of said parent movie frames including at least one child movie region disposed in said parent movie track, whereby said parent video environment includes at least one child movie region, said plurality of tracks further including a child movie track for generation of a child movie video environment, said child movie track containing an ordered sequence of video images stored as a sequence of child movie frames on a child movie track, said child movie track associated with and for display within said at least one child movie region of said certain of said parent movie frames of said parent movie track, the child movie video environment being navigable by the user independently from the parent video environment;

(b) monitoring said user input means for parent movie input from said user indicative of a desire to navigate through said parent video environment and, if said parent movie input is received, displaying another parent movie frame from said parent movie track on said monitor in accordance with the specific parent movie input so as to simulate physical movement around said video image; and (c) monitoring said user input means for input from said user indicative of a desire to navigate through said child movie video environment disposed in said parent video environment and, if said child movie input is received, displaying a child movie frame from said child movie track on said monitor in accordance with the specific child movie input so as to simulate physical movement around said video image.

8. The method of claim 7, further including the step of determining the size, shape and location of said child movie region of said parent movie frame currently being displayed on said monitor and automatically sizing said child movie frame to be displayed within said child movie region.

* * * * *